No. 831,075. PATENTED SEPT. 18, 1906.
W. D. JANES.
BEARING FOR SHADE ROLLERS.
APPLICATION FILED NOV. 16, 1905.
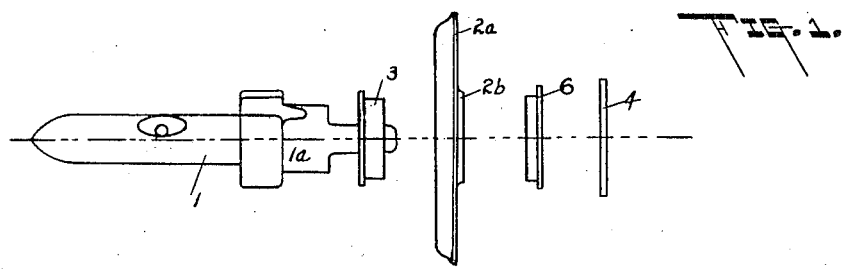
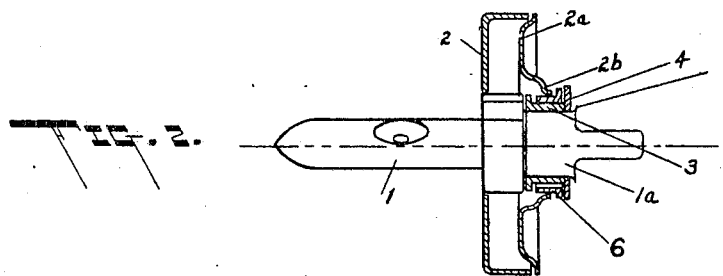
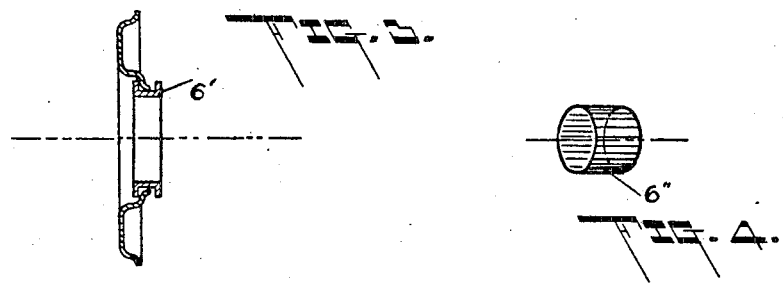
WITNESSES:
Roy Wallis.
G. A. Eastly.
William D. Janes. INVENTOR
BY
Geo. B. Willcop, ATTORNEY
THE NORRIS PETERS CO., WASHINGTON, D. C.

UNITED STATES PATENT OFFICE.

WILLIAM D. JANES, OF SAGINAW, MICHIGAN.

BEARING FOR SHADE-ROLLERS.

No. 831,075.     Specification of Letters Patent.     Patented Sept. 18, 1906.

Application filed November 16, 1905. Serial No. 287,648.

*To all whom it may concern:*

Be it known that I, WILLIAM D. JANES, a citizen of the United States, residing at Saginaw, in the county of Saginaw and State of Michigan, have invented certain new and useful Improvements in Bearings for Shade-Rollers; and I do hereby declare the following to be a full, clear, and exact description of the invention, such as will enable others skilled in the art to which it appertains to make and use the same.

This invention relates to improvements in bearings for shade-rollers, and more particularly to an improved construction and arrangement of the bearing-surfaces between the stationary or non-revoluble spear of the shade-roller and the revoluble pawl-plate, which is secured to the end of the roller and turns with it when the shade is wound or unwound.

It has been common heretofore to fix the pawl-plate to the end of the roller and to provide the pawl-plate with a central aperture, through which projects the non-revoluble spear or spindle. The end of the spear is usually flatted and is held when the shade-roller is in place and ready for use by a slotted bracket fixed to the window-casing. It is thus seen that in previous constructions it has been common to permit the pawl-plate to revolve about the spear, the enlarged opening in the pawl-plate acting as a revolving journal-box, which in revolving is supported by and slides upon the upper periphery of the stationary spear. This previous construction has in practice developed serious objections, the principal one of which is that the wear produced by the revolving pawl-plate upon the spear when the shade is raised and lowered always takes place at one spot on top of the periphery of the stationary spear, the result of which wear is to make the shade operate noisily, producing a disagreeable grinding and resulting in impairing the smoothness and satisfactory operation of the shade-roller. This difficulty has been to some extent overcome by sheathing the stationary bearing of the spear in a short stationary tube of sheet metal, such as brass. The smoother bearing so produced does away to some extent with the objections above noted; but it is not altogether satisfactory for that purpose, because the wear of the revolving pawl-plate is still borne by one spot on the upper periphery of the said stationary tube.

To do away with the objectionable wear on one spot of the stationary bearing of the spear, I have devised a form of bearing in which the point of rubbing contact between the revolving pawl-plate and the bearing on which it rests is automatically shifted. I accomplish this by inserting between the stationary or non-revoluble bearing on the spear and the bearing-surface presented by the periphery of the opening in the pawl-plate a loosely-fitting revoluble bushing or eyelet, preferably in the form of a metallic ring or extremely short tube. This eyelet is retained against longitudinal movement by suitable means, such as will be hereinafter described, but is free to revolve, not only relatively to the stationary bearing of the spear, but also relatively to the rim of the opening in the pawl-plate.

To this end my invention consists in the devices illustrated in the accompanying drawings, and the equivalents thereof, as will now be more fully set forth.

The preferred forms of my improved bearings are illustrated in the accompanying drawings, in which—

Figure 1 is an enlarged view of the spear, the revoluble eyelet and pawl-plate shown in position ready for assembling. Fig. 2 is a view showing the same parts assembled. Figs. 3 and 4 are modified forms of the revoluble eyelet.

Upon the spear 1, which may be of any suitable or usual construction, is mounted the shade-roller cap 2, having a cover or pawl-plate $2^a$. This pawl-plate, as is well known, revolves with the shade-roller around the spear 1 when the shade is wound or unwound. The weight of the shade-roller and shade and the force of the pull necessary to lower the shade against the resistance of the winding-spring in the roller is supported by the pawl-plate $2^a$, the actual bearing-point being at the top periphery of the opening $2^b$. The stationary spear is usually provided with a cylindrical bearing-surface $1^a$, which may, if desired, be protected by a brass sleeve 3, fixed to the stationary bearing $1^a$ by any suitable means—such as, for example, the washer 4—clamped to the end of the sleeve 3 by spreading or swaging out the metal at the end of the bearing $1^a$, as shown at 5 in Fig. 2.

As has been previously described, it has heretofore been common to run the rubbing surface of the pawl-plate $2^a$ directly upon the spear-bearing $1^a$ or upon the sleeve 3, which may have been used to protect it. In either case it is obvious that since neither the bearing 1ª nor the sleeve 3 are adapted to rotate the wear of the pawl-plate 2ª will always come at one spot on the upper periphery of the bearing 1ª or upon the upper periphery of the sleeve 3, as the case may be. To obviate this difficulty, I insert between the rim of the opening 2ᵇ and the stationary bearing by which it is supported—namely, the bearing 1ª or the sleeve 3—a loosely-fitting revoluble eyelet 6, preferably made of pressed sheet metal, such as brass or equivalent material. This eyelet 6 is loose not only upon the spear, but is also loose within the bearing-rim of the pawl-plate 2ª. The effect of this improvement is to bring the wear, due to the bearing pressure of the pawl-plate, not upon the one spot of the spear-bearing, but to distribute the wear over practically the entire surface of the loose eyelet 6, thereby greatly prolonging the life of the shade-roller and improving its smoothness of operation, making it under all conditions practically noiseless.

With each operation of the shade-roller the eyelet 6 shifts its position by rotating to some extent with the roller, each of such movements presenting a new bearing-surface to receive the rubbing action of the pawl-plate.

The loosely-mounted eyelet 6 may be made of any suitable form, either with one flange, as shown in Figs. 1 and 2, or with two flanges, as shown at 6′ in Fig. 3, or without flanges, as shown at 6″ in Fig. 4.

By the means above described I have introduced into the art of shade-roller manufacture an improvement which produces a bearing of simple construction and insures practically uniform wear of the revolving pawl-plate upon the stationary part by which it is supported.

What I claim as my invention, and desire to secure by Letters Patent, is as follows:

1. A shade-roller comprising a normally stationary spindle, a spear mounted therein, a bearing-surface on the spear, an eyelet loosely mounted on the bearing-surface of the spear and a roller-supporting plate having an opening of considerably larger diameter than the diameter of the eyelet surrounding the member, so that the upper edge only of the aperture rests upon the bearing-surface of the spear.

2. As an attachment for shade-roller bearings, a normally stationary spear having a bearing-surface formed thereon, a smooth bushing stationarily mounted upon the bearing-surface, a wear-distributing member loosely mounted on the bushing and a shade-roller-supporting plate loosely encircling the member.

3. As an attachment for shade-roller bearings, a normally stationary spear having a bearing-surface formed thereon, a smooth bushing stationarily mounted upon the bearing-surface, a wear-distributing member loosely mounted on the bushing and of less length than the bushing, and a shade-roller-supporting plate loosely encircling the member.

4. In a shade-roller bearing, the combination with a stationary support, of a bearing member secured on the support, a wear-distributing means loosely received upon the bearing member, the latter projecting beyond the wear-distributing means, a roller-supporting member mounted upon the wear-distributing means, and means for limiting the longitudinal movement of the wear-distributing means.

5. As an attachment for shade-roller bearings, a normally stationary spear having a bearing-surface formed thereon, a smooth bushing stationarily mounted upon the bearing-surface, a wear-distributing member loosely mounted on the bushing and of less length than the bushing, a shade-roller-supporting plate loosely encircling the member, and means on the spear for limiting the longitudinal movement of the member.

6. In a shade-roller bearing, the combination with a normally stationary spear, of a bushing received on the spear, a flanged wear-distributing member journaled upon the bearing member, the outer end of the bushing projecting beyond the wear-distributing member, a roller-supporting plate journaled upon the wear-distributing member, a means engaging the outer end of the bushing for retaining the parts in assembled position and limiting the lateral movement of the member.

7. A shade-roller bearing comprising a normally stationary spear, a bearing-surface formed thereon, a smooth sleeve non-rotatably mounted on the bearing, an eyelet loosely and rotatably mounted on the sleeve, and a roller-supporting plate loosely and rotatably journaled on the eyelet.

8. A shade-roller bearing comprising a normally stationary spear, a bearing-surface formed thereon, a flanged eyelet loosely mounted on the bearing-surface, and a roller-supporting plate loosely journaled on the eyelet.

In testimony whereof I affix my signature in presence of two witnesses.

WILLIAM D. JANES.

Witnesses:
 Roy Wallis,
 A. A. Easterly.